Patented Jan. 24, 1939

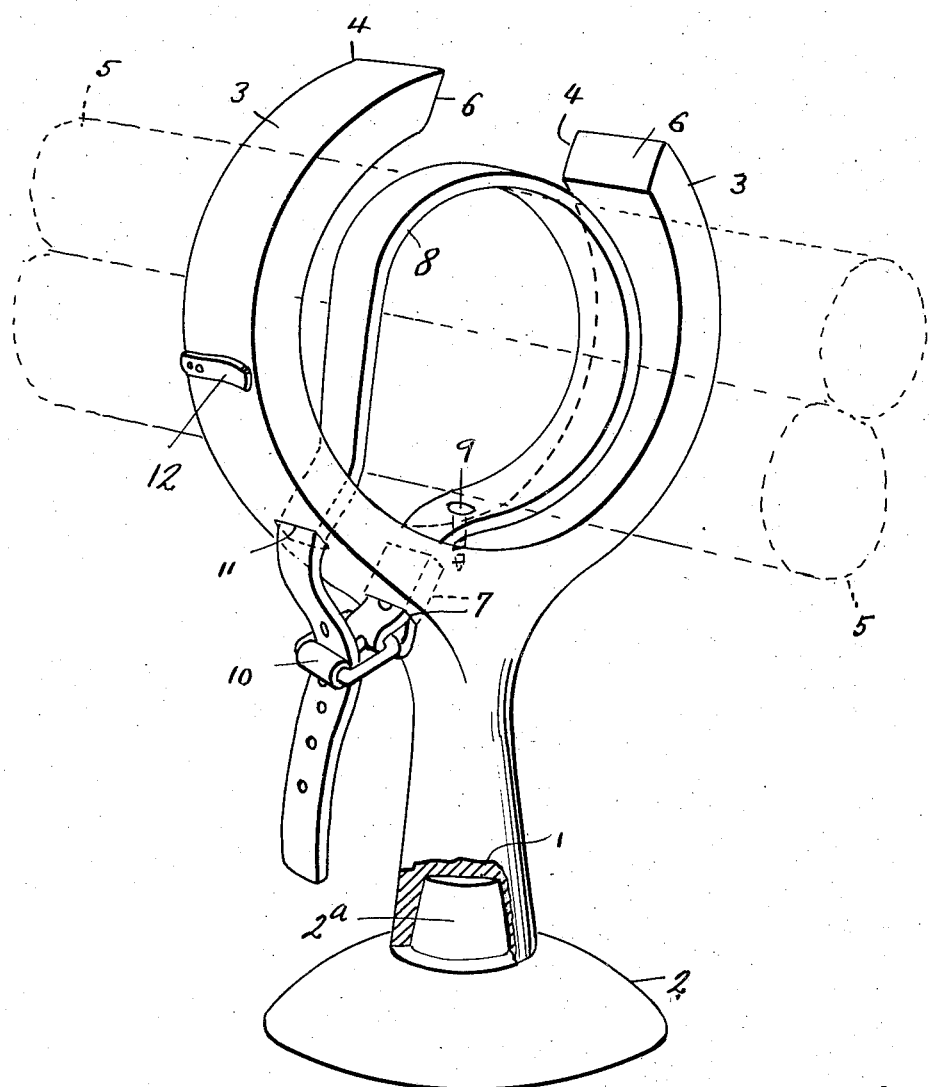

2,144,876

UNITED STATES PATENT OFFICE 2,144,876

FISHING POLE CARRIER

Clarence C. Garnett, Minden, La., assignor of one-half to Grover C. Powdrill, Minden, La.

Application August 17, 1937, Serial No. 159,573

2 Claims. (Cl. 248—251)

My invention relates to improvements in carriers, especially adaptable for use on motor vehicles for supporting fishing poles and the like, and is especially designed to be applied to the fenders at one side of the vehicle, or may be conveniently placed on the roof of the same.

The principal object of the invention is to provide a device of this character which may be quickly attached and detached to the fenders of a vehicle, or applied to the top of the car.

Another object of the invention is to provide a device of this character which will eliminate any possibility of the fishing poles coming into contact with the body of the car, thus preventing the possibility of scarring, scratching or otherwise marring the finish of the automobile.

A still further object of the invention is to provide means whereby the fishing poles are held firmly in the carrier while in transportation.

Broadly, my invention comprises a standard which is suitably provided with arms which are shaped substantially part-circular in form to provide a support for a fishing pole, the standard having secured thereto a conventional type vacuum cup or sucker to hold the carrier firmly in place. Within the support I provide a strap which is adapted to hold the fishing pole firmly in place while in transportation.

Further objects and advantages of the invention will be apparent during the course of the following description.

With the foregoing in view, the invention resides in the novel subject matter hereinafter described and claimed, the description being supplemented by the accompanying drawing, in which:

The figure is a perspective view of the carrier constructed in accordance with the principles of the invention, a portion thereof being broken away and in section.

In the drawing, wherein for the purpose of illustration is shown a preferred embodiment of the invention, the numeral 1 designates a standard and has secured at its bottom portion a vacuum cup 2 which is suitably provided with a shank portion 2a, the shank being inserted through a socket in the standard 1, and securely held in place by any suitable means. The standard 1 is provided at its upper end with a pair of yoke forming arms 3 which are formed in a substantially part-circular shape, the ends 4 terminating an appreciable distance apart to form an opening to receive the fishing poles or the like indicate by the dotted lines and designated by the numeral 5. The free ends 4 of the arms 3 are beveled as indicated by the numeral 6, which facilitates inserting the poles. One of the arms 3 is provided with an opening 7 through which passes a strap 8 which is anchored against slipping on the bottom of the yoke by means of a tack or the like 9.

As shown, the strap 8 is provided at the anchored end with a buckle 10 which is disposed at the outer periphery of one of the arms 3. The strap is adapted to be wrapped around the fishing poles 5, after which the free end is inserted through a complemental opening 11 in the arms 3 and adjusted in the buckle means 10 to firmly hold the fishing poles 5 firmly in place. At the outer side of the arms 3 I provide a spring clip 12 which is adapted to accommodate the free end of the strap 8.

From the foregoing it will be seen that I have produced a device which is characterized by its simplicity, and efficient construction, and one which will provide a durable support for carrying fishing poles on the fenders or top of a vehicle. Then, too, my carrier prevents the poles from coming into contact with the body of the car, thus preventing any scratching, scarring, or otherwise marring the finish.

In addition, my device provides means of safety since the poles are virtually locked on the support by means of the strap. Hence, there is very little chance of the poles becoming lost in transportation.

It is thought that persons skilled in the art to which the invention relates will be enabled to obtain a clear understanding of the invention after considering the drawing in connection with the description. Therefore, a more lengthy description is regarded as unnecessary.

Since excellent results are obtainable from the details disclosed, they are preferably followed. However, within the scope of the invention as claimed, numerous modifications may of course be made.

I claim:

1. A carrier for fishing poles comprising a standard having a socket formed in the lower end thereof, means for removably securing said carrier on a mobile support, said means including a vacuum cup having a shank portion adapted to fit snugly in said socket, a pair of arms rising from said standard and formed integrally therewith, said arms being substantially circular to form a support for said fishing poles, the ends of said arms being beveled to facilitate inserting the poles, and terminating a short distance apart to provide an opening for passage of the poles therein, one of said arms being provided with parallel openings at the lower end thereof, a retention strap having a buckle at one end and adapted to pass through the openings in said arm, means for anchoring one end of said strap to the support, said strap being adapted to extend circumferentially around the inner ends of said arms and adapted to embrace said poles, and further adapted to bridge the open end of said support for holding said poles firmly and securely in position.

2. A carrier for fishing poles comprising a standard having a socket formed in the lower end thereof, a vacuum cup associated with the lower end of said standard for removably securing said carrier on a mobile support, a pair of arms rising from said standard and formed integrally therewith, said arms being substantially circular to form a support for said fishing poles, the ends of said arms being beveled to facilitate inserting the poles, and terminating a short distance apart to provide an opening for passage of the poles therein, one of said arms being provided with parallel openings, a retention strap having a buckle at one end and adapted to pass through the openings in said arm, said strap being adapted to extend circumferentially around the inner ends of said arms and adapted to embrace said poles, and further adapted to bridge the open end of said support for holding said poles firmly and securely in place.

CLARENCE C. GARNETT.